United States Patent
Boltze et al.

[15] 3,694,489
[45] Sept. 26, 1972

[54] PHARMACOLOGICALLY ACTIVE ESTERS AND AMIDES OF N-[3-TRIFLUOROMETHYLPHENYL]-ANTHRANILIC ACID

[72] Inventors: Karl-Heinz Boltze, Bensberg-Kippekausen; Otfried Brendler, Cologne-Mulheim; Dietrich Lorenz, Bensberg, all of Germany

[73] Assignee: Troponwerke Dinklage & Co., Cologne-Mulheim, Germany

[22] Filed: July 16, 1970

[21] Appl. No.: 55,564

[30] Foreign Application Priority Data

Aug. 1, 1969 Germany..........P 19 39 111.8

[52] U.S. Cl.............260/471 R, 260/340.9, 260/472, 424/309
[51] Int. Cl..............................................C07c 103/16
[58] Field of Search............................260/471 R, 472

[56] References Cited

OTHER PUBLICATIONS

Wagner, R.B. et al.; Syn. Org. Chem. (1967), Pub. by John Wilby & Sons, Inc., Page 484.

*Primary Examiner*—Lorraine A. Weinberger
*Assistant Examiner*—L. Arnold Thaxton
*Attorney*—Burgess, Dinklage & Sprung

[57] ABSTRACT

Compounds of the general formula

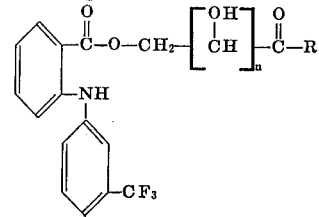

in which $n$ is 0, 1 or 2 and R represents a hydroxyl group, a low molecular weight straight chained or branched alkoxy group in which the alkyl radical may have individual hydrogen atoms replaced by hydroxyl groups, an amino group or a low molecular weight straight chained or branched mono- or dialkylamino group in which individual hydrogen atoms of the alkyl groups may be replaced by hydroxyl groups.

These compounds have a marked antiinflammatory effect and reduced side effects.

14 Claims, No Drawings

PHARMACOLOGICALLY ACTIVE ESTERS AND AMIDES OF N-[3-TRIFLUOROMETHYLPHENYL]-ANTHRANILIC ACID

This invention relates to pharmacologically active esters and amides of N-[3-trifluoromethylphenyl]-anthranilic acid and process for preparing them.

The invention provides pharmacologically valuable compounds of the general formula I

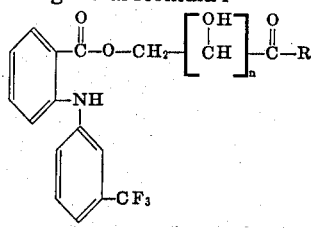

in which $n$ represents 0 or 1 or 2, R represents a hydroxyl group, a low molecular weight straight or branched alkoxy group in which individual hydrogen atoms of the alkyl radical may be replaced by hydroxyl groups, an amino group or a low molecular weight straight chained or branched mono- or dialkylamino group, individual hydrogen atoms of which alkyl groups may be replaced by hydroxyl groups.

The low molecular weight alkyl radicals mentioned above more particularly contain one to four C atoms in the alkyl portion and may be substituted with up to and including three hydroxyl groups.

It is known that N-(3-trifluoromethylphenyl)-anthranilic acid (hereinafter referred to as II) administered per os has a marked antiinflammatory action (see WINDER et al. Arthrit. Rheumat. 6, 36–47 (1963), or D.E. BARNARDO et. al., Brit. med. J. 1966 II, 342–343). The strongly acid properties of the compound, which may lead to disturbances of the gastrointestinal tract, are however found to be a disadvantage. It has therefore also been proposed to use the aluminum salt instead of the free acid (see French Pat. No. 1,424,797).

Another disadvantage is that for local application the free acid cannot be used in the form of a gel as the ionogenically active substances prevent gel formation.

The above mentioned compounds according to the invention have the advantage over II that while having an equally good antiinflammatory action they do not give rise to any gastrointestinal disturbances, are effective when administered orally and, provided they do not consist of non-ionogenic molecules, can readily be incorporated into gel formulations for administration. In addition, they have a distinctly wider therapeutic range since the $LD_{50}$ values are about 1.5 to 3 times higher than in the case of II.

The positive protein turbidity test of MIZUSHIMA (see Arch. int. Pnarmacodyn. 157 (1965), page 115 et seq.) moreover showed that the compounds have their own activity which is not due to the hydrolysis of I which takes place in the body.

The compounds of the general formula I according to the invention may advantageously be carried out by reacting a metal salt of II with a compound of the general formula III

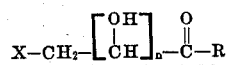   III in which $n$ and R have the meaning mentioned above and X represents a halogen atom or a sulphonic acid ester radical.

The metals most suitable for the salt formation are those of the alkali metal group. The use of solvents is advantageous but not essential. Suitable solvents are, for example, aromatic hydrocarbons such as benzene, toluene or xylene as well as those of a strongly polar character, such as dimethylformamide. The reaction velocity and yield are increased by elevated temperatures. The reaction generally takes place at the boiling point of the solvent.

The invention also includes pharmacoligical preparations which contain the new compounds in addition to the usual vehicles.

The following Examples are given by way of illustration only:

EXAMPLE 1

[N-(3-Trifluoromethylphenyl)-anthraniloyl] glycollic acid amide 40 g (0.125 mol) of the potassium salt of N-(3-trifluoromethylphenyl) anthranilic acid dissolved in 200 ml of dimethylformamide, and 11.7 g (0.125 mol) of chloroacetic acid amide are heated to boiling for 5 minutes. The solvent is then evaporated off and the residue dissolved in a little water. After extraction with chloroform, washing with water, drying over sodium sulphate and evaporating off the chloroform, 30.6 g (72 percent of the theoretical) of [N-(3-trifluoromethylphenyl)-anthraniloyl] glycollic acid amide is obtained which after recrystallization from isopropanol melts at 155° to 156° C.

For $C_{16}H_{13}F_3N_2O_3$:
Calculated C 56.8%; H 3.87%; F 16.85%; N 8.27%;
Found C 57.03%; H 4.11%; F 16.95%; N 8.31%.

The following compounds are prepared in a similar manner.

EXAMPLE 2

[N-(3-Trifluoromethylphenyl)-anthraniloyl]-glycollic acid dimethylamide
M.p. = 105° C to 108° C (methanol/petroleum ether).
Yield 61 percent of the theoretical.
For $C_{18}H_{17}F_3N_2O_3$
Calculated C 59.0%; H 4.68%; N 7.65%;
Found C 59.29%; H 4.81%; N 7.60%.

EXAMPLE 3

[N-(3-Trifluoromethylphenyl-anthraniloyl] glycollic acid N-(2,3-dihydroxypropyl) amide
M.p. = 116° C to 118° C (methanol/ether/petroleum ether).
For $C_{19}H_{19}F_3N_2O_5$
Calculated C 55.4%; H 4.64%; N 6.79%;
Found C 55.69%; H 4.67%; N 6.94%.

EXAMPLE 4

[N-(3-Trifluoromethylphenyl)-anthraniloyl] glycollic acid N,N-bis-(2-hydroxyethyl) amide 95 g (0.298 mol) of the potassium salt of N-(3-trifluoromethylphenyl) anthranilic acid and 54.6 g (0.330 mol) of N,N-bis-(2-hydroxyethyl)-chloroacetamide, dissolved in 500 ml of dimethylformamide, are heated to 110° C for 3.5 hours and then to 120° C for 1 hours.

The product is worked up as in Example 1, using diethylether instead of chloroform for extraction. The resulting [N-(3-trifluoromethylphenyl)-anthraniloyl] glycollic acid N,N-bis-(2-hydroxyethyl) amide melts at 98° C to 100° C after crystallization from methanol/ether/ petroleum ether.

For $C_{20}H_{21}F_3N_2O_5$:
Calculated C 56.3%; H 4.96%; N 6.56%;
Found C 56.18%; H 5.17%; N 6.48%.

EXAMPLE 5

[N-(3-Trifluoromethylphenyl)-anthraniloyl] glycollic acid N-[tris-(hydroxymethyl)-methyl] amide 51 g (0.16 mol) of the potassium salt of N-(3-trifluoromethylphenyl)-anthranilic acid and 32 g (0.16 mol) of N-[tris-(hydroxymethyl)-methyl] chloroacetamide dissolved in 250 ml of dimethylformamide are stirred for 4 hours at 80° C. The product is worked up as in Example 1. The resulting [N-(3-trifluoromethylphenyl)-anthraniloyl] glycollic acid N-[tris-(hydroxymethyl)-methyl] amide melts at 124°C to 126°C after crystallization from methanol/ether/petroleum ether.

For $C_{20}H_{21}F_3N_2O_6$:
Calculated C 54.2%; H 4.78%; N 6.33%;
Found C 53.97%; H 4.82%; N 6.29%.

EXAMPLE 6

[N-(3-Trifluoromethylphenyl)-anthraniloyl] glycollic acid ethyl ester 350 g (1.1 mol) of the potassium salt of N-(3-trifluoromethylphenyl) anthranilic acid dissolved in 700 ml of dimethylformamide, and 350 ml (3.31 mol) of ethyl chloroacetate are stirred for 30 minutes at 80° C. The solvent is then evaporated off and the oily residue is introduced into about 700 ml of water. After extraction with 700 ml and then 200 ml of diisopropylether, washing with 200 ml of water, drying over sodium sulphate and then evaporating off the diisopropyl ether, a viscous residue which can be crystallized from petroleum ether (b.p. 40° to 60° C) is obtained. The yield is 362 g (90 percent of the theoretical). [N-(3-trifluoromethylphenyl)-anthraniloyl] glycollic acid ethyl ester melts at 42° to 44° C.

For $C_{18}H_{16}F_3NO_4$:
Calculated C 58.9%; H 4.39%; F 15.5%; N 3.82%;
Found C 58.67%; H 4.40%; F 15.53%; N 3.91%.

EXAMPLE 7

[N-(3-Trifluoromethylphenyl)-anthraniloyl] glycollic acid.

3.49 g (0.95 mol) of the ester prepared in Example 6 are boiled under reflux with 1.75 ml of glacial acetic acid and 698 ml of 1N hydrochloric acid for one hour. The reaction mixture is then dissolved in water and extracted with chloroform. 284.6 g (85. of the theoretical) of [N-(3-trifluoromethylphenyl)-anthraniloyl] glycollic acid are obtained, which after recrystallization from ether/petroleum ether melts at 126° to 128° C.

For $C_{16}H_{12}F_3NO_4$:
Calculated C 56.6%; H 3.57%; F 16.8%; N 4.13%;
Found C 56.96%; H 3.70%; F 16.79%; N 4.30%.

EXAMPLE 8

[N-(3-Trifluoromethylphenyl)-anthraniloyl] glycollic acid-(2-hydroxyethyl) ester 317 g (0.84 mol) of the potassium salt of [N-(3-trifluoromethylphenyl)-anthraniloyl] glycollic acid are dissolved in 1,500 ml of dimethylformamide and boiled under reflux with 168 ml (2.50 mol) of 2-chloroethanol for 30 minutes. The product is worked up as in Example 6. 238 g (74 percent of the theoretical) of [N-(3-trifluoromethyl-phenyl)-anthraniloyl]-glycollic acid (2-hydroxyethyl)-ester which has a melting point of 45° to 48° C after recrystallization from diisopropylether are obtained.

For $C_{18}H_{16}F_3NO_5$:
Calculated: C 56.4%; H 4.21%; F 14.9%; N 3.66%;
Found C 56.53%; H 4.35%; F 14.5%; N 3.87%.

EXAMPLE 9

3-[N-(3-Trifluoromethylphenyl)-anthraniloyl-oxy]-2-hydroxy-pripionic acid amide 31.9 g (0.1 mol) of the potassium salt of N-(3-trifluoromethylphenyl) anthranilic acid and 18.5 g (0.15 mol) of 3-chloro-2-hydroxypropionic acid amide are dissolved in 100 ml of dimethylformamide and stirred for 2.5 hours at 110° C. The precipitate formed is filtered off and dimethylformamide is evaporated off. The brown residue is dissolved in a small amount of water, covered with a layer of ether and rendered alkaline with dilute sodium hydroxide solution. The ethereal phase is removed and dried over sodium sulphate and the ether is distilled off. After recrystallization from toluene and benzene, 16.2 g (44.3 percent of the theoretical) of 3-[N-(3-trifluoromethylphenyl)-anthraniloyloxy]-2-hydroxypropionic acid amide which melts at 120° C are obtained.

For $C_{17}H_{15}F_3N_2O_4$:
Calculated C 55.41%; H 4.10%; F 15.48%; N 7.61%;
Found C 55.86%; H 3.71%; F 15.50%; N 7.69%.

EXAMPLE 10

[N-(3-Trifluoromethylphenyl)-anthraniloyl] glycollic acid methyl ester

Yield 53 percent of the theoretical. M.p. = 40° to 43° C (petroleum ether).

For $C_{17}H_{14}F_3NO_4$:
Calculated C 57.8%; H 3.97%; N 3.97%;
Found C 57.98%; H 3.96%; N 4.13%.

EXAMPLE 11

[N-(3-Trifluoromethylphenyl)-anthraniloyl] glycollic acid isopropyl ester

Yield 67 percent of the theoretical. M.p. = 53° to 55° C (petroleum ether).

For $C_{19}H_{18}F_3NO_4$:
Calculated C 59.9%; H 4.72%; N 3.67%;
Found C 59.92%; H 4.82%; N 3.92%.

The procedure of Examples 10 and 11 is the same as that of Example 6.

EXAMPLE 12

[N-(3-Trifluoromethylphenyl)-anthraniloyl] glycollic acid (2,3-dihydroxypropyl) ester 10 g (0.0664 mol) of 4-chloromethyl-2,2-dimethyl dioxolane are added to 10 g (0.0265 mol) of the potassium salt of [N-(3-trifluoromethylphenyl)-anthraniloyl] glycollic acid dissolved in 50 ml of dimethylformamide and the reaction mixture is heated under reflux for 2 hours. The solvent is then evaporated off and the residue taken up in water. After extraction with ether, washing with water and drying over sodium sulphate, the ether is evaporated off and the brown crude product is purified in ether with active charcoal and filtered over aluminum oxide. 7.2 g (60 percent of the theoretical) of [N-(trifluoromethylphenyl)-anthraniloyl] glycollic acid [2,2-dimethyl dioxolanyl-(4)-methyl]-ester are obtained in the form of a colorless oil. 36 ml of 0.5 percent sulphuric acid are added to a solution of 7.2 g of this ester in 36 ml of ethanol and the solution is boiled for 15 minutes. The reaction product is introduced into water and extracted with ether. After washing with water, drying over sodium sulphate and evaporating off the solvent, 2.0 g of [N-(3-trifluoro-methylphenyl)-anthraniloyl] glycollic acid 2,3-dihydroxy-propyl ester which melts at 68° to 72° C after recrystallization from ether/petroleum ether are obtained.

For $C_{19}H_{18}F_3NO_6$:
Calculated C 55.2%; H 4.38%; F 13.8%; N 3.38%;
Found C 55.23%; H 4.31%; F 13.62%; N 3.65%.

What is claimed is:

1. Compounds of the general formula

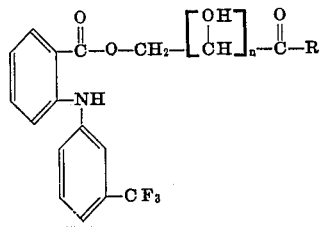

I in which $n$ is 0, 1 or 2 and R represents a hydroxyl group, a low molecular weight straight chained or branched alkoxy group in which the alkyl radical may have individual hydrogen atoms replaced by hydroxyl groups, an amino group or a low molecular weight straight chained or branched mono or dialkylamino group in which individual hydrogen atoms of the alkyl groups may be replaced by hydroxyl groups.

2. Compounds as claimed in claim 1 in which R represents an alkoxy group which contains one to four carbon atoms in the alkyl portion and which may be substituted by up to three carbon atoms.

3. The compound of claim 1 which is [N-(3-Trifluoromethylphenyl)-anthraniloyl] glycollic acid amide.

4. The compound of claim 1 which is [N-(3-Trifluoromethylphenyl)-anthraniloyl] glycollic acid dimethylamide.

5. The compound of claim 1 which is [N-(3-Trifluoromethylphenyl)-anthraniloyl] glycollic acid N-(2,3-dihydroxypropyl) amide.

6. The compound of claim 1 which is [N-(3-Trifluoromethylphenyl)-anthraniloyl] glycollic acid N,N-bis-(2-hydroxyethyl) amide.

7. The compound of claim 1 which is [N-(3-Trifluoromethylphenyl)-anthraniloyl] glycollic acid N-[tris-(hydroxymethyl)-methyl] amide.

8. The compound of claim 1 which is [N-(3-Trifluoromethylphenyl)-anthraniloyl] glycollic acid ethyl ester.

9. The compound of claim 1 which is [N-(3-Trifluoromethylphenyl)-anthraniloyl] glycollic acid.

10. The compound of claim 1 which is [N-(3-Trifluoromethylphenyl)-anthraniloyl] glycollic acid (2-hydroxyethyl) ester.

11. The compound of claim 1 which is 3-[N-(3-Trifluoromethylphenyl)-anthraniloyloxy]-2-hydroxypropionic acid amide.

12. The compound of claim 1 which is [N-(3-Trifluoromethylphenyl)-anthraniloyl] glycollic acid methyl ester.

13. The compound of claim 1 which is [N-(3-Trifluoromethylphenyl)-anthraniloyl] glycollic acid isopropyl ester.

14. The compound of claim 1 which is [N-(3-Trifluoromethylphenyl)-anthraniloyl] glycollic acid (2,3-dihydroxypropyl) ester.

* * * * *